United States Patent
Seidensticker, Jr. et al.

[11] Patent Number: 6,108,784
[45] Date of Patent: Aug. 22, 2000

[54] ENCRYPTION OF APPLICATIONS TO ENSURE AUTHENTICITY

[75] Inventors: Robert B. Seidensticker, Jr., Woodinville; Vinay Deo, Bellevue; Michael J. O'Leary, Redmond, all of Wash.

[73] Assignee: Microsoft Corporation, Redmond, Wash.

[21] Appl. No.: 08/826,544

[22] Filed: Apr. 3, 1997

Related U.S. Application Data

[60] Provisional application No. 60/025,748, Sep. 16, 1996.

[51] Int. Cl.[7] ........................................................ H04L 9/00
[52] U.S. Cl. ......................... 713/187; 713/188; 713/200; 705/51; 705/57; 380/28; 380/287
[58] Field of Search ................................... 380/44, 4, 23, 380/25, 21, 28, 278, 28.7; 713/200, 187, 188; 705/51, 57

[56] References Cited

U.S. PATENT DOCUMENTS

| | | | |
|---|---|---|---|
| 4,853,962 | 8/1989 | Brockman | 380/44 |
| 5,268,962 | 12/1993 | Abadi et al. | 380/21 |
| 5,915,025 | 6/1999 | Taguchi et al. | 380/44 |
| 5,956,402 | 9/1999 | Vo | 380/21 |

*Primary Examiner*—Tod R Swann
*Assistant Examiner*—Paul E. Callahan
*Attorney, Agent, or Firm*—Ronald M. Anderson

[57] ABSTRACT

A software application is modified in a defined manner to prevent it being executable by a processor until the modified software application is decoded. Preferably, a sum of all of the bytes comprising a header of the software application (sufficiently small in size to be referred to as an "applet") is determined. In this embodiment, applet includes pseudo-code (p-code). Only the least most significant byte of the sum is used as a variable for modifying the p-code of the applet. Preferably, the variable is added to each byte of the p-code, except that only the first byte of a multi-byte p-code is thus modified. Alternatively, a different logical operator can be employed such as a subtract, AND, XOR, etc. for modifying the p-code. The modified program is then transferred to a portable pager that is also capable of maintaining personal information and executing small software applications. A processor in the pager device decodes p-code from the modified applet when needed during execution of the applet, by determining the variable that was used to modify the p-code and then subtracting the variable from p-code. The resulting p-code is then executable by the pager device. Modifying software code in this manner helps to insure that only software applets from an approved source that are written in an approved manner are executed by the portable paging device. This same approach can be used for encoding/decoding software transferred for execution on other types of small devices, such as cell phones and PIM devices.

28 Claims, 5 Drawing Sheets

ENCRYPTION OF APPLICATIONS TO ENSURE AUTHENTICITY

RELATED APPLICATION

This application is a continuation-in-part of prior provisional patent application Ser. No. 60/025,748, filed Sep. 19, 1996, the benefit of the filing date of which is hereby claimed under 35 U.S.C. § 119(e).

FIELD OF THE INVENTION

The present invention generally pertains to encrypting software applications, and more specifically, to modifying the code in the application in a defined manner so that the application will not execute on a specific platform unless properly decoded, to ensure that the application is in an approved form and from an approved source.

BACKGROUND OF THE INVENTION

The transfer of data and downloading of applications from personal computers to portable computing devices has become commonplace. The communication between such devices can be over a cable linking their serial/parallel ports, via modems that use the telephone system, by display screen modulation, over an infrared (IR) data link, or through a radio frequency (RF) transmission. Floppy disks or other types of non-volatile transferable storage such as compact disk-read only memory (CD-ROM) disks can alternatively be used to load application programs into a portable computing device.

A new type of portable computing device is being developed that will enable personal information management (PIM) functions to be combined with portable communication functions. A first commercial embodiment of this new technology will likely be a pager that includes PIM capabilities. In addition to receiving conventional page messages over a standard paging channel, this device, which is referred to as "Nomad" will maintain data such as schedules, addresses, phone numbers, contacts, etc. Furthermore, it will have a limited processing capability so that small software applications can be executed by it. These software applications, which are called "applets" because of their small size, can be downloaded from a personal computer or other source into a memory of the Nomad pager over the RF paging channel or via an IR data link. The capabilities of Nomad are clearly not limited to a combination pager and PIM. It is expected that many of the features and functions of Nomad, including the ability to run small application programs, will be incorporated in other portable devices, such as cell phones, watches, pocket organizers, etc.

One of the problems that must be addressed as this new technology becomes available is the potential for application software to be downloaded that does not behave properly and thus, causes problems in the operation of the portable device on which the software is executed. Since an applet can be downloaded to Nomad as a paging object without being requested by the user, the user may not even know the source of an applet. It will therefore be important to provide a mechanism to prevent improperly written applets from executing on Nomad, since such software could adversely affect the normal operation of the device or cause loss of important data stored in the device. Thus, it will be apparent that some technique should be employed to discourage or prevent improperly written application software from executing on the device. Consumers will likely demand that only application software from an approved source will be able to execute on the device to ensure that the software is properly written and does not cause problems when executed.

SUMMARY OF THE INVENTION

In accord with the present invention, a method is defined for modifying a software application so as to prevent the modified software application from being executed by a processor until the modified software is restored to an unmodified form. The method includes the step of determining a sum of code components contained within a predefined section of the software application. A modifying value is determined that includes at least a portion of the sum. A different section of the software application is then modified by combining the modifying value and code components contained within the different section of the software application, to produce the modified software application. When thus modified, the software will not be executable by the processor until the modification is undone.

The predefined section of the software application preferably comprises a header section. In a preferred embodiment of the invention, the step of determining the modifying value comprises the step of discarding a portion of the sum. In this case, the modifying value is limited to a predefined number of bytes (e.g., one byte).

Preferably, the step of combining comprises the step of adding the modifying value to at least one byte of the software components in the section of the software application that is to be modified. Alternatively, the step of combining can comprise the step of employing a different logical binary operator (besides ADD) to combine the modifying value with the software components in the different section of the software application.

A further aspect of the present invention is directed to a method for decoding a software application that has been encoded or modified using the method described above. To decode the software application, the modifying value that is determined as explained above is subtracted from the software components in the different section or combined with the software components using a logical operator, producing the original (unmodified) software application, which can then be executed by the processor.

Still further aspects of the present invention are directed to a system that modifies a software application in a defined manner so as to prevent the modified software application from being executable by a processor, and a system that decodes an encoded or modified software application to enable it to be executed by the processor. The systems include a memory that stores machine instructions. When executed by the processor, the machine instructions cause the processor to implement functions that are generally consistent with the steps of the two methods discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred form of the present invention is embodied in a combination pager and data management device, which is referred to herein as "Nomad." However, it is contemplated that the present invention can also be practiced using other portable electronic devices. For example, a combination cellular phone and data management device could offer many of the benefits and advantages of Nomad. Such devices will have enhanced utility compared to existing portable data management (PIM) devices, and the functions and portability of such devices will more likely encourage the user to carry the device at all times. Accordingly, it is not intended that the scope of the present invention be limited by the disclosure of the present preferred combination of pager and data management device.

User Interface

Figure 1:
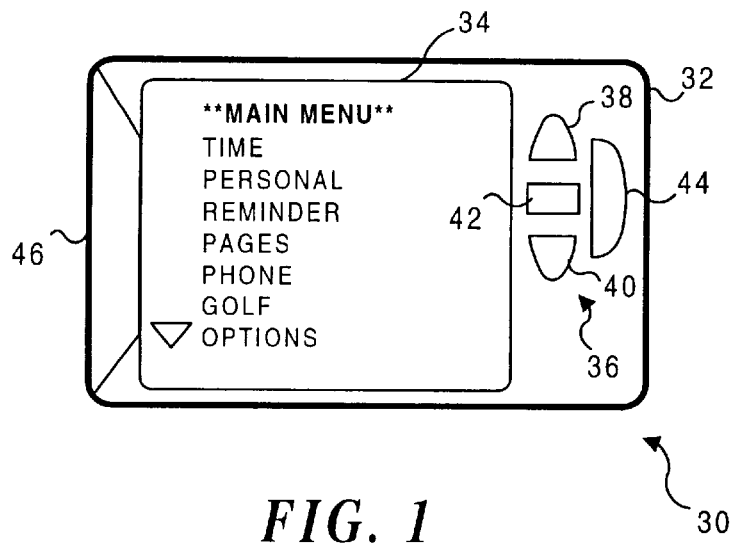
FIG. 1 is a plan view of a combined pager and data management device embodying the present invention (i.e., Nomad)

A top view of a Nomad pager and data management device 30 is shown in FIG. 1. Nomad includes a housing 32. The user interface for the device includes a keypad 36 disposed on the top of housing 32 and having four buttons that are used to control the display and the functions performed by Nomad in connection with its conventional paging function and its novel data management functions. The buttons comprise an Action button 42, a Back button 44, an Up button 38, and a Down button 40. The buttons enable the user to navigate through a directory/menu hierarchy like that shown in FIG. 1. The Action/Back buttons are paired as opposites having a pair functionality similar to that of the Enter and Escape keys on a conventional QWERTY keyboard. The Action button takes the user in (to a selected lower level) and the Back button takes the user out (to a next higher or parent level). The Up/Down buttons are another functional pair of buttons that move the user up and down within a display 34. Display 34 is preferably a liquid crystal display (LCD), which in the preferred embodiment can display a maximum of eight lines, with 17 characters per line. Other types and sizes of displays can alternatively be used.

Figure 2:
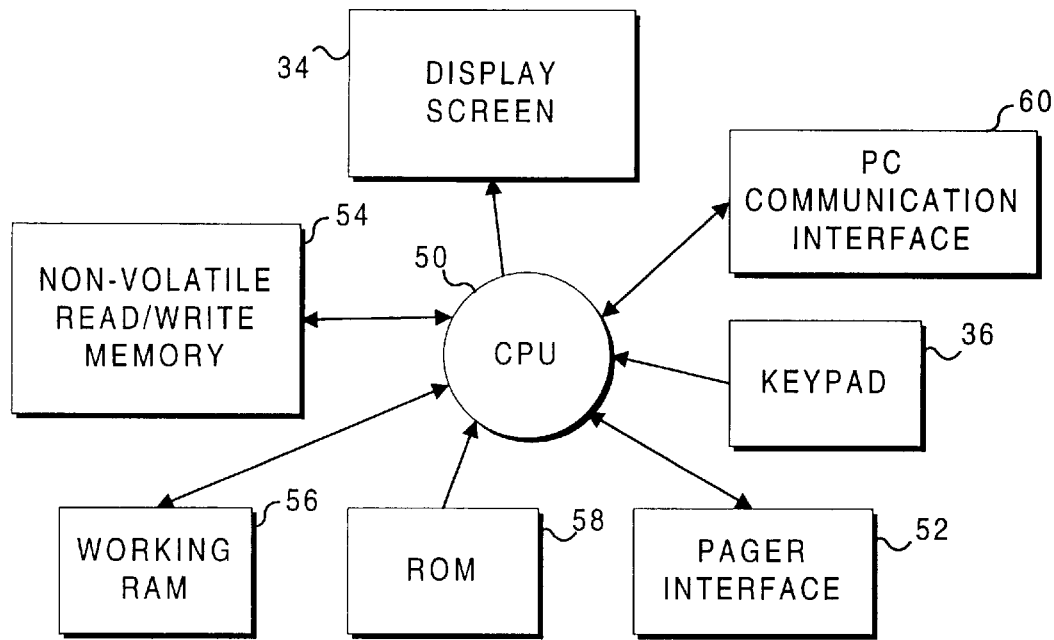
FIG. 2 is a schematic functional block diagram of Nomad.

Referring now to FIG. 2, a functional block diagram illustrates the components comprising Nomad. An eight-bit central processing unit (CPU) 50 implements the software controlled functions performed by Nomad. CPU 50 is coupled to display 34 so that text and graphic icons generated in accord with the controlling software appear on the display. Data that are downloaded or entered by the user into Nomad are stored in a non-volatile read/write memory 54, and this memory is thus bidirectionally coupled to the CPU, which reads and writes the data in a serial stream. The capacity of the non-volatile memory is about eight Kbytes in the preferred embodiment. A working random access memory (RAM) 56 (having a capacity of about four Kbytes in the preferred embodiment) is also coupled bidirectionally to the CPU, and provides volatile storage for binary instructions comprising software applications or applets that are executed by the CPU and storage for temporary data such as registers. Default values for configuration options and other variables are stored in a read only memory (ROM) 58, which has a capacity of about 40 Kbytes. The ROM is also used to store the operating code that controls the basic functionality of Nomad, e.g., its conventional paging function.

Paging signals received by Nomad are handled through a pager interface 52, which is coupled to CPU 50. Although not implemented in a current embodiment, it is contemplated that in a future embodiment, the paging capability will be bidirectional. As already noted, keypad 36 provides a simple user interface to permit control of the device, editing, and other user determined selections to be entered with only four buttons. Since the data stored in non-volatile memory 54 are likely to be more extensive than a user would care to enter using only the four buttons, such data are most efficiently entered through a PC communication interface 60. Preferably, this interface comprises an IR sensor/transmitter 46 (shown in FIG. 1), which communicates through an IR data port of a personal computer (PC) (not shown). Data are downloaded from the PC to Nomad through the PC communication interface or alternatively, by a paging signal transmission, and are uploaded to the PC from Nomad through this interface.

Screen Layout

Nomad's display 34 is employed to portray bitmapped characters in eight rows by 17 columns, allowing a substantial amount of information to be viewed at one time. Although not shown in FIG. 1, above the display area will be a row of icons, and on the left-hand side of the display area may be one or two auxiliary icons resembling up and down arrows, which are used to indicate that lines of items are available above and/or below the lines currently on the display. The up icon indicates that hidden lines exist above the visible text, and the down icon indicates that hidden lines exist below the visible text.

Navigation and Menu Support

Navigation on Nomad is done with hierarchical menus, enabling the user to move through a tree structure. FIG. 1 illustrates the Main Menu on display 34. The first line of a menu is typically its title (" MAIN MENU " in the illustrated example). The menu title is in upper case and is set off with asterisks to visually distinguish it from the other items in the menu. The title is optional—the software used to load the data into Nomad (executed on the PC) can choose to send a title or not.

The user moves a selection line (which causes the line to appear in reverse video on the display) up and down to select a desired list item. When the selection line is at the bottom and the down (arrow) icon is showing on the display, the next Down button push scrolls the list up one line, keeping the selection line at the bottom. When the selection line is on the last list item, the down (arrow) icon is no longer displayed, and additional Down button actuations do nothing. The analogous process applies to the Up arrow button. The title line is never selectable, but it scrolls off the screen as if it were just another list item as depression of the Down button moves the selected line below the original bottom line displayed.

Modification of Application Software and Decoding Modified Software

Application software suitable for execution by Nomad is typically developed using a conventional personal computer. The application software is written in a high level language such as Visual Basic, Visual C++, or a Nomad specific macro language and is then converted to pseudo-code (p-code). Further, in accordance with the present invention, the software application in p-code is then modified or encoded in a defined manner to ensure that when received by Nomad, either as an RF page transmission over a conventional paging channel, by downloading using an IR data link, or by any other suitable means, the modified or encoded software application will be properly decoded to restore the software application to a form that is executable by processor 50 in Nomad. Application software or applets that are not properly modified before being transmitted to Nomad will not be correctly decoded by Nomad and therefore will not be executable by processor 50. Since the same decoding procedure is applied to all applets that are transferred to Nomad before the software is executed, only applets that have been modified in the defined manner before being downloaded to Nomad will be properly decoded. Consequently, it will be difficult (but clearly not impossible) for applets from a non-approved source to be modified before being transferred to Nomad so that the applets will be correctly decoded. If not correctly decoded, applets from a non-approved source should not function when the user attempts to execute them.

In the claims that follow, the terms "software component" or "software code" are intended to encompass the one or more hexadecimal bytes of p-code that are used in the preferred embodiment of Nomad to represent a specific function implemented by CPU 50 when running an applet, and these terms are intended to more generally apply to any discrete element of a computer program. In general, for the preferred embodiment of the present invention, an applet image has at least as many software code components as it has event handlers. Furthermore, in this embodiment, each event handler in an applet is preceded by a short header and includes one or more p-codes (i.e., single or multi-byte p-codes). The applet image also has a header that is at the beginning of the applet image and which contains information about the applet.

Figure 3:
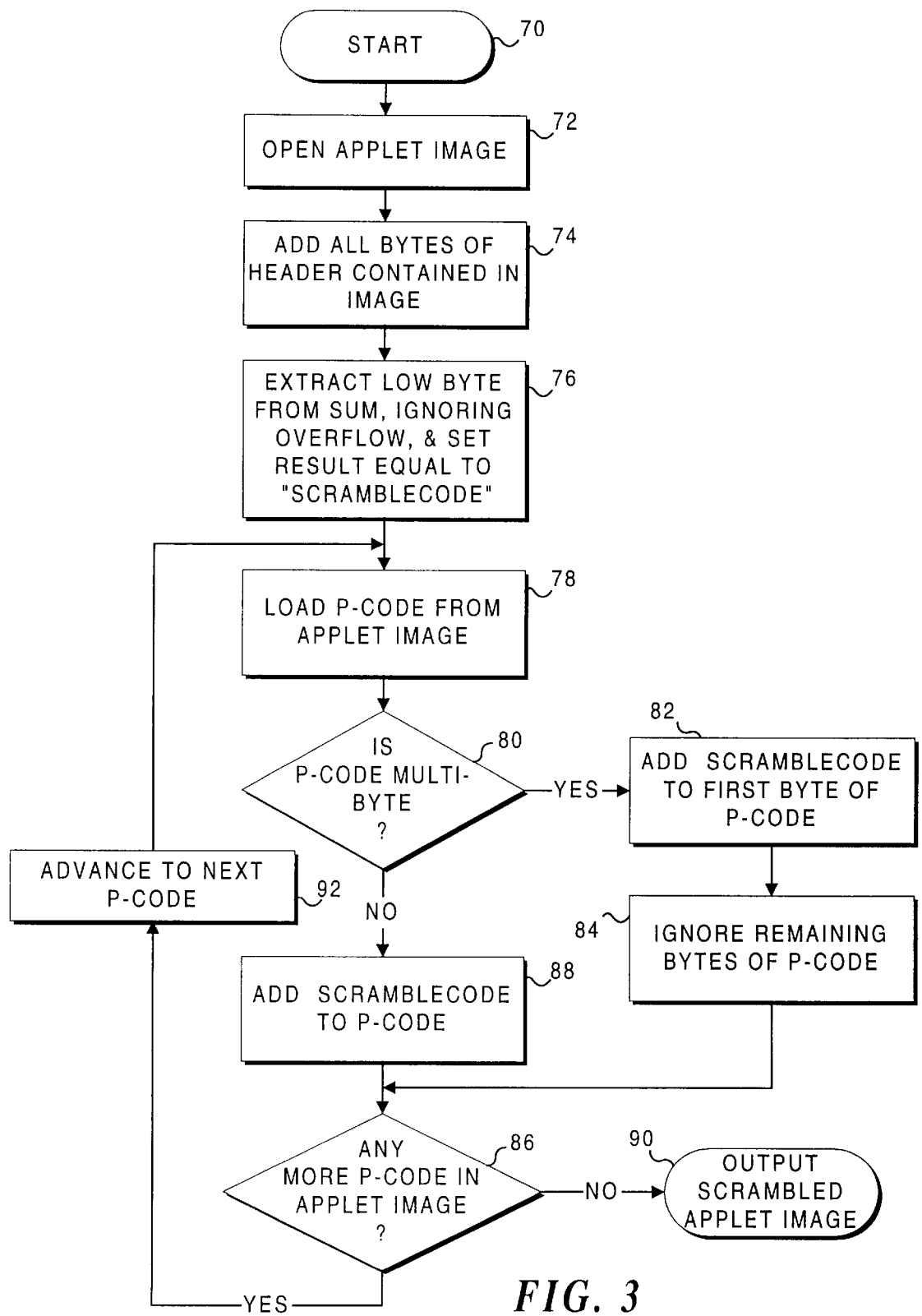
FIG. 3 is a flow chart illustrating the logic used for scrambling components of a software application in accord with the present invention.

In the preferred embodiment, the modification of the p-code comprising an applet in a predefined manner is implemented by the personal computer following the logic shown in FIG. 3. This process, which processes the p-code of the applet image in bulk, proceeds from a start block 70 to a block 72 in which the applet image stored on the personal computer is opened for access of the p-code. Next, in a block 74, all of the bytes of the header at the beginning of the applet are added. As is typical of software applications, the header comprises a discrete and clearly identifiable section of the code. The remaining portion of the p-code for an applet includes variables and the p-code instructions implemented by Nomad. Adding all of the bytes in the header that are contained in the image yields a sum. A block 76 provides for extracting the least significant byte from the sum by simply ignoring the overflow. The resulting single byte is set equal to a variable "ScrambleCode," which serves as a key to encode the applet image.

In a block 78, the first p-code following the header is loaded from the applet image. A decision block 80 determines if the p-code just loaded is multibyte. If so, a block 82 provides for adding the ScrambleCode variable to the first byte of the p-code component. As indicated in a block 84, the procedure ignores the remaining bytes of the multi-byte p-code, i.e., the ScrambleCode is not added to the remaining bytes of the multi-byte p-code, and they are left unchanged. The logic then proceeds to a decision block 86.

If the result in decision block 80 indicates that the current p-code is only a single byte, the logic proceeds to a block 88, which adds the ScrambleCode to the single byte p-code. Thereafter, the logic also proceeds to decision block 86.

In decision block 86, the procedure determines if any more p-code remains in the applet image to be processed. If further p-code remain to be processed in decision block 86, the logic proceeds to a block 92 which advances to the next p-code. Thereafter, the logic returns to a block 78 to load that p-code from the applet image for processing as described above. Once all of the p-code in the applet image have thus been processed, the logic proceeds to a block 90, which provides for output of the scrambled or modified applet image. This modified applet image is thus ready to be downloaded into the Nomad non-volatile read/write memory.

Figure 4:
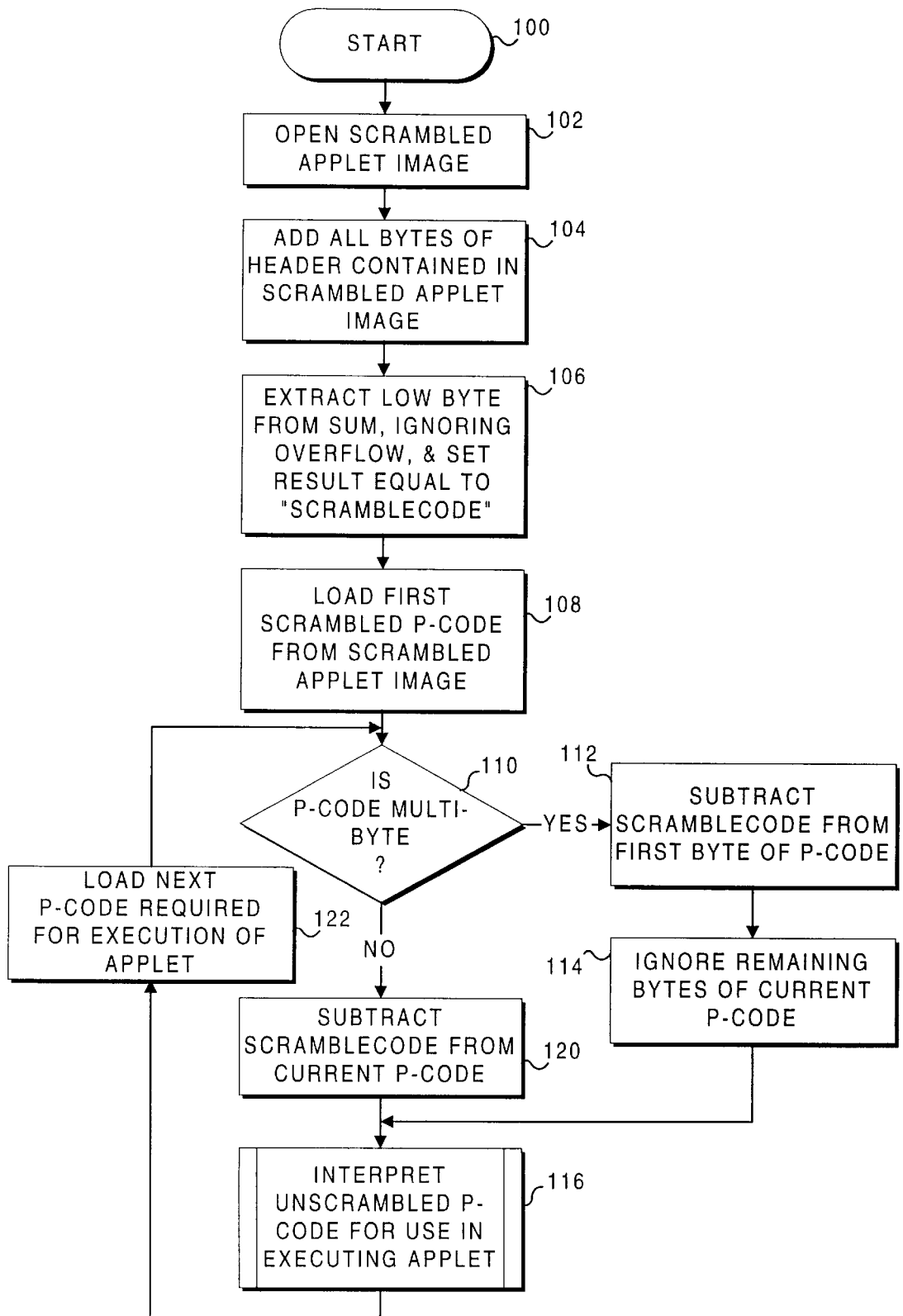
FIG. 4 is a flow chart showing the steps for unscrambling the scrambled components of the software application to enable the application to be executed by a processor in Nomad.

Turning now to FIG. 4, the steps of the procedure implemented by processor 50 in Nomad for decoding the scrambled or modified applet to restore p-code from the original software application as needed are illustrated beginning at a start block 100. It should be noted that in order to minimize any delay incurred in starting execution of an applet in the limited processing environment of Nomad, the p-code required to be loaded into RAM for execution are decoded only when needed and a decoded applet image is not retained. Thus, each time that a p-code is required in executing an applet, the p-code is decoded, even though it may require decoding numerous times during the full execution of the applet. Also, depending upon logical branching that may occur during execution of an applet, it is quite possible that some encoded p-code will not be decoded because it is not required during the execution of the applet. However, it is nevertheless contemplated (in the alternative) that an entire encoded applet image can be decoded prior to beginning execution of an applet, so that the fully decoded applet is available before execution of the applet starts.

The logic first proceeds to a block 102 in which the processor opens the scrambled applet image for decoding. In a block 104, all bytes of the header contained within the scrambled applet image are added, producing a sum. Next, in a block 106, the least significant byte is subtracted from the sum. In this step, the processor determines the ScrambleCode or key that will be used for decode each p-code when the decode p-code is required to be loaded into RAM for continuing execution of the applet. A block 108 provides for loading the first needed modified or scrambled p-code, which will typically be the p-code immediately following the header in the scrambled applet image. Next, a decision block 110 determines if the p-code that is being currently processed is a multi-byte p-code. If so, a block 112 provides for subtracting the ScrambleCode variable (or key) from the first byte of the multi-byte p-code. As indicated in a block 114, the method ignores the remaining bytes of the p-code, since they were not previously modified during the scrambling process. The logic then proceeds to a block 116.

In the event that the p-code being processed is only a single byte, the logic proceeds from decision block 110 to a block 120. In block 120, the scrambled code is subtracted from the single byte p-code, producing decoded or unscrambled p-code. Thereafter, the logic again arrives at block 116. Block 116 indicates a step that is actually outside the method of the present invention; in this step, the decoded p-code is interpreted by CPU 50 as a step in executing the applet being decoded. It will be apparent that the step in block 116 may involve implementing any function that is represented by the p-code that was just decoded. When another p-code is needed during the execution of the applet, the logic proceeds to a block 122, which provides for loading the next encoded p-code required during execution of the applet. The logic then returns to block 110 for decoding of the encoded p-code loaded in block 122, as described above. Although not indicated in any of the blocks, the decoding logic simply terminates if no encoded p-code is required, i.e., if Nomad is not executing an encoded applet.

If the applet that was downloaded to Nomad was not scrambled or modified in the defined manner, the process applied to decode the downloaded applet will produce results that are not properly executable by CPU 50 on Nomad. Thus, only p-code from applets that have been properly modified in the defined manner before being downloaded to Nomad will be decoded correctly by this process so that the p-code can be properly executed after being decoded.

In the preferred embodiment for scrambling or modifying a software application shown in FIG. 3, the ScrambleCode is simply added to successive p-code components (ignoring all but the first byte of a multi-byte p-code). It is also contemplated that other techniques could be used for modifying the code of a software application and then subsequently decoding the modified software application. For example, when combining the ScrambleCode with a p-code byte, a different binary operator such as subtract, AND, XOR, etc., could be employed instead of ADD. Furthermore, instead of combining the ScrambleCode with only a first byte of a multi-byte component and with each successive single-byte component, the variable could be combined with every $n_{th}$ byte or with bytes selected in accord with a simple series (such as the Fibonacci series: 1, 1, 2, 3, 5, 8, 13, 21, etc.). Furthermore, instead of using a ScrambleCode variable corresponding to the sum of all of the bytes of the header, a constant value could be used or value combined with the p-code can be incremented by one each time that it is used, or by a larger constant. Furthermore, the ScrambleCode variable can be a changing value modified by yet another predefined variable each time that a software application is modified. The ScrambleCode constant could also be increased according to the Fibonacci sequence, i.e.,:

$$ScrambleCode = ScrambleCode + K_{next}$$

where:

$$K_{next} = K_2 + K_1$$

$$K_1 = K_2, \text{ and}$$

$$K_2 = K_{next}$$

after initializing $K_1$ to zero, $K_2$ to 1, and $K_{next}$ to 1. Furthermore, it is contemplated that the ScrambleCode could be determined as a function of the sum of the bytes in a portion of the software application other than the header and can be combined with the p-code components in a different portion of the software application besides the code section. In effect, the present invention provides for modifying any software application (not just small applets) in almost any predefined manner, wherein the modification is reversed to decode the modified software application to recover the original code so that the application can be executed by a processor.

Data Exchange System and PC Executed Software (Proteus)

Figure 5:
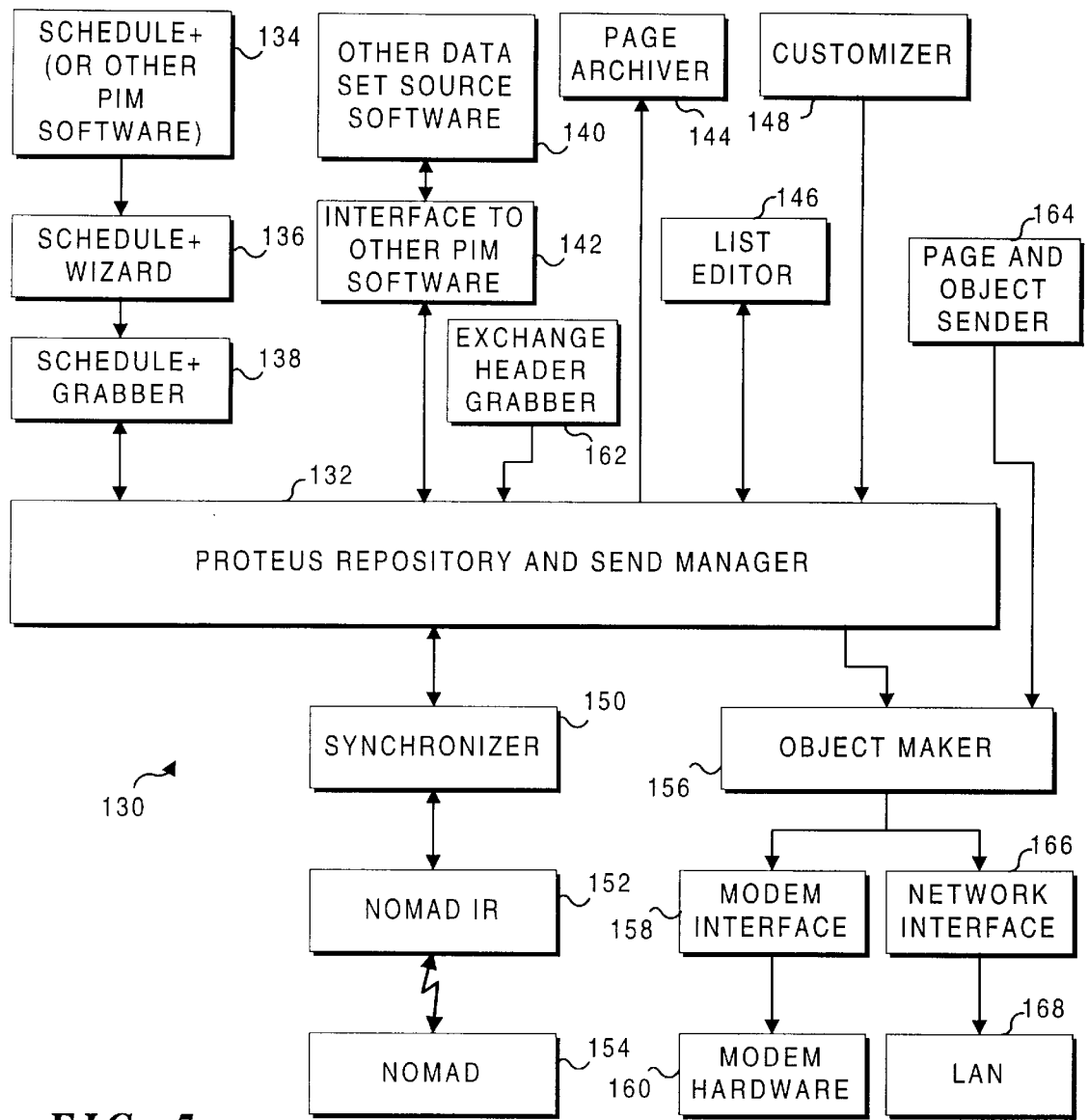
FIG. 5 is a block diagram illustrating the data exchange system between a personal computer and Nomad through an IR data port and via paging transmissions.

The software developed to download applets and facilitate data exchange between Nomad and the PC, and also used to setup Nomad is currently called "Proteus." This software is executed on the PC to permit data to be exchanged between Nomad and the PC as noted above. FIG. 5 is a block diagram that illustrates components 130, which are used for exchanging PIM data, applets, and other data between the PC and Nomad device. A Proteus repository and Send Manager 132 serves as the control for any data exchange. Microsoft Corporation's SCHEDULE+™ PIM (or other related software from different companies) can serve as the source of the PIM data that are to be downloaded into Nomad, as indicated in a block 134. If the SCHEDULE+ PIM software is the source of the PIM data, a block 136 indicates that a Wizard is provided in this software to facilitate the PIM data download operation, assisting the user in selecting specific portions of the PIM data that are to be downloaded. A block 138 provides a "grabber" for conveying data bidirectionally between the PIM software and the Proteus control software.

In addition to PIM software applications, database applications and other programs can exchange data with Nomad, as indicated in a block 140. The other applications are coupled to the Proteus control through an interface to other PIM software, as noted in a block 142. For example, an application used to develop applets and modify the applet p-code can be coupled to Proteus in this manner. Also preferably coupled to the Proteus control are a Page archiver 144, a list editor 146 that is used for editing lists (such as To Do lists), a customizer 148, and an EXCHANGE™ header grabber 162. The customizer permits options to be selected that customize the operation of Nomad, as noted above.

A synchronizer block 150 is used for synchronizing data stored in a Nomad 154 and in the Proteus Repository over an IR port 152. Also coupled to the control is an object maker 156, which is set up to provide paging objects that can be used to edit or update data within Nomad. As explained above, such objects are transmitted as a page over conventional page RF channels. A modem interface 158 couples the object maker to modem hardware 160, so that the object can be conveyed over the phone lines to a paging transmitter and transmitted by radio to Nomad. Also coupled to the object maker is a network interface 166, that provides communication to other computers (not required in the present invention) connected in a local area network (LAN) 168. A page and object sender 164 is also directly coupled to object maker 156, bypassing the Proteus Repository and Send Manager.

Personal Computer System Used to Transmit Page Objects

Figure 6:
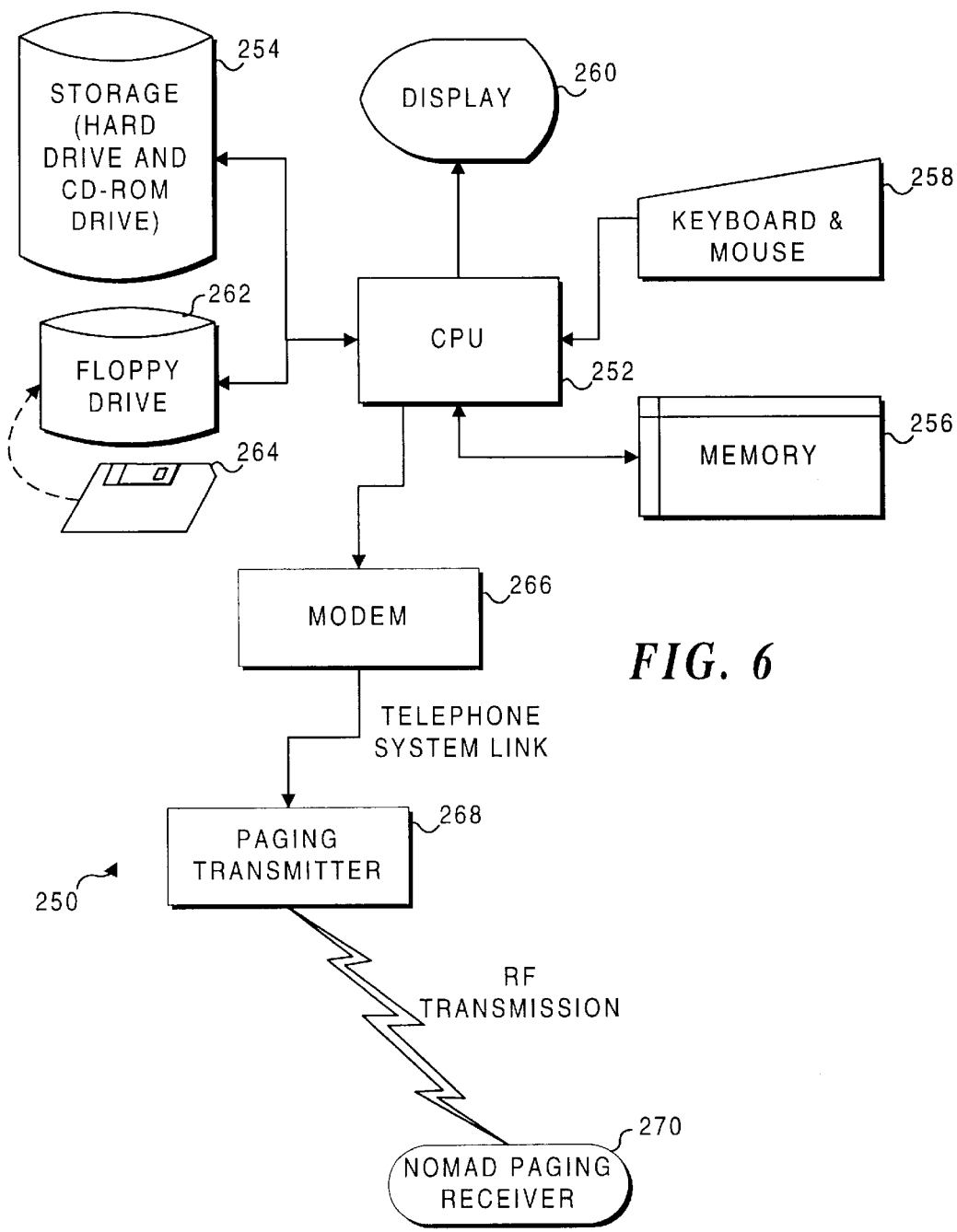
FIG. 6 is a block diagram of a generally conventional personal computer used for transmitting page objects to Nomad in accord with the present invention.

FIG. 6 illustrates components of a generally conventional PC system 250 that is used to transmit page objects to Nomad and to determine the sender's preference for notifying the user upon the receipt of the page objects by Nomad. Such page objects can include applets that are modified before being transmitted, in accord with the present invention. PC system 250 can be used for writing the software applications and/or modifying the p-code comprising such applications before transmitting them as paging objects to Nomad. A CPU 252 is included to implement machine instructions that define each of the functions implemented by PC system 250, including the functions related to determining the data comprising the page object and the sender's preference for visual and audible notification of the recipient carrying Nomad. Storage 254 is provided for application programs and data employed by CPU 252, including a hard drive and optionally a compact disk-read only memory (CD-ROM) drive (not separately shown). The high capacity non-volatile memory comprising storage 254 is coupled bidirectionally to CPU 252, as is a floppy drive 262. The floppy drive is provided to read and write to a floppy disk 264. It is likely that the software comprising machine instructions controlling the paging and notification functions of the present invention will be distributed on such a floppy disk for loading into the hard drive comprising storage 254. When the sender wants to send a page object to Nomad, the software comprising the machine instructions that control the paging functions will be loaded into a memory 256 that includes both ROM and RAM. Once loaded into RAM, the machine instructions are executed by CPU 252 to implement the paging functions and selection of the notification parameters that the sender prefers be associated with the page object being sent.

Also included in personal computer system 250 is a display 260, which is coupled to CPU 252 (typically through a display interface card, which is not separately shown). The sender can use a keyboard and mouse 258 for composing paging messages or for selecting other types of page objects that are transmitted to Nomad. By employing the keyboard and/or mouse, the sender can select the desired visible and audible notification and other parameters associated with the page object before it is transmitted to Nomad. If these parameters are not selected by the sender, default parameters are used. The CPU is connected to a modem 266 to enable communication of data over a conventional telephone system link to a paging transmitter 268. Modem 266 is only one of several different ways for the CPU to communicate with paging transmitter 268. The paging transmitter produces the RF transmission that conveys the page object to a Nomad paging receiver 270. This depiction of page object transmission is grossly simplified, but the details of the paging system are not essential to the present invention. Thus, the relatively complex paging transmitter system that is conventionally employed to ensure that a page transmission will reach the intended recipient at any point in a relatively large geographic area is not shown.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for modifying a software application including a predefined section comprising a plurality of software code components, said plurality of software code components comprising a plurality of bytes and including at least one instruction, to prevent a thus modified software application from being executed by a processor until restored to an unmodified form, comprising the steps of:
   (a) determining a sum of at least a portion of the plurality of the bytes comprising the software code components contained within the predefined section of the software application;
   (b) determining a modifying value that comprises at least a portion of the sum; and
   (c) modifying a different section of the software application by combining the modifying value and software code components contained within said different section of the software application, to produce the modified software application.

2. The method of claim 1, wherein the predefined section of the software application comprises a header section.

3. The method of claim 1, wherein the step of determining the modifying value comprises the step of discarding a portion of the sum.

4. The method of claim 3, wherein the modifying value is limited to a predefined number of bytes.

5. The method of claim 1, wherein the step of combining comprises the step of adding the modifying value to at least one byte of the software code components in said different section of the software application.

6. The method of claim 1, wherein the step of combining comprises the step of employing a logical binary operator to combine the modifying value with the software code components in said different section of the software application.

7. A method for decoding a software application including a predefined section comprising a plurality of software code components, said plurality of software code components comprising a plurality of bytes and including at least one instruction that has been encoded in a defined manner preventing the software application from being executed by a processor until the software application is decoded, comprising the steps of:
   (a) determining a sum of at least a portion of the plurality of the bytes comprising the software code components contained within the predefined section of the software application;
   (b) determining a decoding value that comprises at least a portion of the sum; and
   (c) processing a different section of the software application, by combining the decoding value and software code components contained within said different section of the software application, to produce a decoded software component that is executable by the processor to run the software application.

8. The method of claim 7, wherein the predefined section of the software application comprises a header section.

9. The method of claim 7, wherein the step of determining the decoding value comprises the step of discarding a portion of the sum.

10. The method of claim 9, wherein the decoding value is limited to a predefined number of bytes.

11. The method of claim 7, wherein the step of combining comprises the step of subtracting the decoding value from at least one byte of the software code components in said different section of the software application.

12. The method of claim 7, wherein the step of combining comprises the step of employing a logical binary operator to combine the decoding value with the software components in said different section of the software application.

13. The method of claim 7, wherein each software component is decoded only when required for execution when the processor is running the application.

14. A system for modifying a software application including a predefined section comprising a plurality of software code components, said plurality of software code components comprising a plurality of bytes and including at least one instruction to prevent software components from a thus modified software application from being executed by a processor until restored to an unmodified form, comprising:
   (a) a memory for storing a plurality of machine instructions; and
   (b) a processor that is coupled to the memory and executes the machine instructions stored therein, said machine instructions causing the processor to implement a plurality of functions, including:
      (i) determining a sum of at least a portion of the plurality of the bytes comprising the software code components contained within the predefined section of the software application;
      (ii) determining a modifying value that comprises at least a portion of the sum; and
      (iii) modifying a different section of the software application by combining the modifying value and software code components contained within said different section of the software application, to produce the modified software application.

15. The system of claim 14, wherein the predefined section of the software application comprises a header section.

16. The system of claim 14, wherein the processor determines the modifying value by discarding a portion of the sum.

17. The system of claim 16, wherein the modifying value is limited to a predefined number of bytes.

18. The system of claim 14, wherein the processor combines the modifying value and the software code components by adding the modifying value to at least one byte of software code components in said different section of the software application.

19. The system of claim 14, wherein the processor employs a logical binary operator to combine the modifying value with the software code components in said different section of the software application.

20. A system for decoding a software application including a predefined section comprising a plurality of software code components, said plurality of software code components comprising a plurality of bytes and including at least one instruction that has been encoded in a defined manner that prevents the software application from being executed by a processor until the software application is decoded, comprising:
 (a) a memory for storing a plurality of machine instructions; and
 (b) a processor that is coupled to the memory and executes the machine instructions stored therein, said machine instructions causing the processor to implement a plurality of functions, including:
  (i) determining a sum of at least a portion of the plurality of bytes comprising the software code components contained within the predefined section of the software application;
  (ii) determining a modifying value that comprises at least a portion of the sum; and
  (iii) processing a different section of the software application by combining the decoding value and software code components contained within said different section of the software application, to produce a decoded software code that is executable by the processor.

21. The system of claim 20, wherein the predefined section of the software application comprises a header section.

22. The system of claim 20, wherein the processor determines the decoding value by discarding a portion of the sum.

23. The system of claim 22, wherein the decoding value is limited to a predefined number of bytes.

24. The system of claim 20, wherein the processor combines the modifying value and the software code components by subtracting the modifying value from at least one byte of the software code components in said different section of the software application.

25. The system of claim 20, wherein the processor employs a logical binary operator to combine the modifying value with the software code components in said different section of the software application.

26. The system of claim 20, wherein the processor only produces the decoded software code required when said code is required for execution by the processor.

27. A method for modifying a software application to prevent a thus modified software application from being executed by a processor until restored to an unmodified form, comprising the steps of:
 (a) defining a key for use in modifying the software application, said key being determinable from the modified software application; and
 (b) combining the key with software code components that include at least one instruction and are contained within a section of the software application, to produce the modified software application for distribution.

28. A method for decoding a modified software application that has been encoded in a defined manner that prevents the modified software application from being executed by a processor until decoded, comprising the steps of:
 (a) in a predefined manner, processing the modified software application to determine a key for use in decoding the modified software application; and
 (b) using the key, decoding the software application, by combining the key and software code components that include at least one instruction and are contained within said modified software application, to produce a decoded software application that is executable by the processor.

* * * * *